April 12, 1960 K. E. WATSON 2,932,164
THRUST REVERSER AND CONTROL MECHANISM THEREFOR
Filed Aug. 3, 1955 2 Sheets-Sheet 1
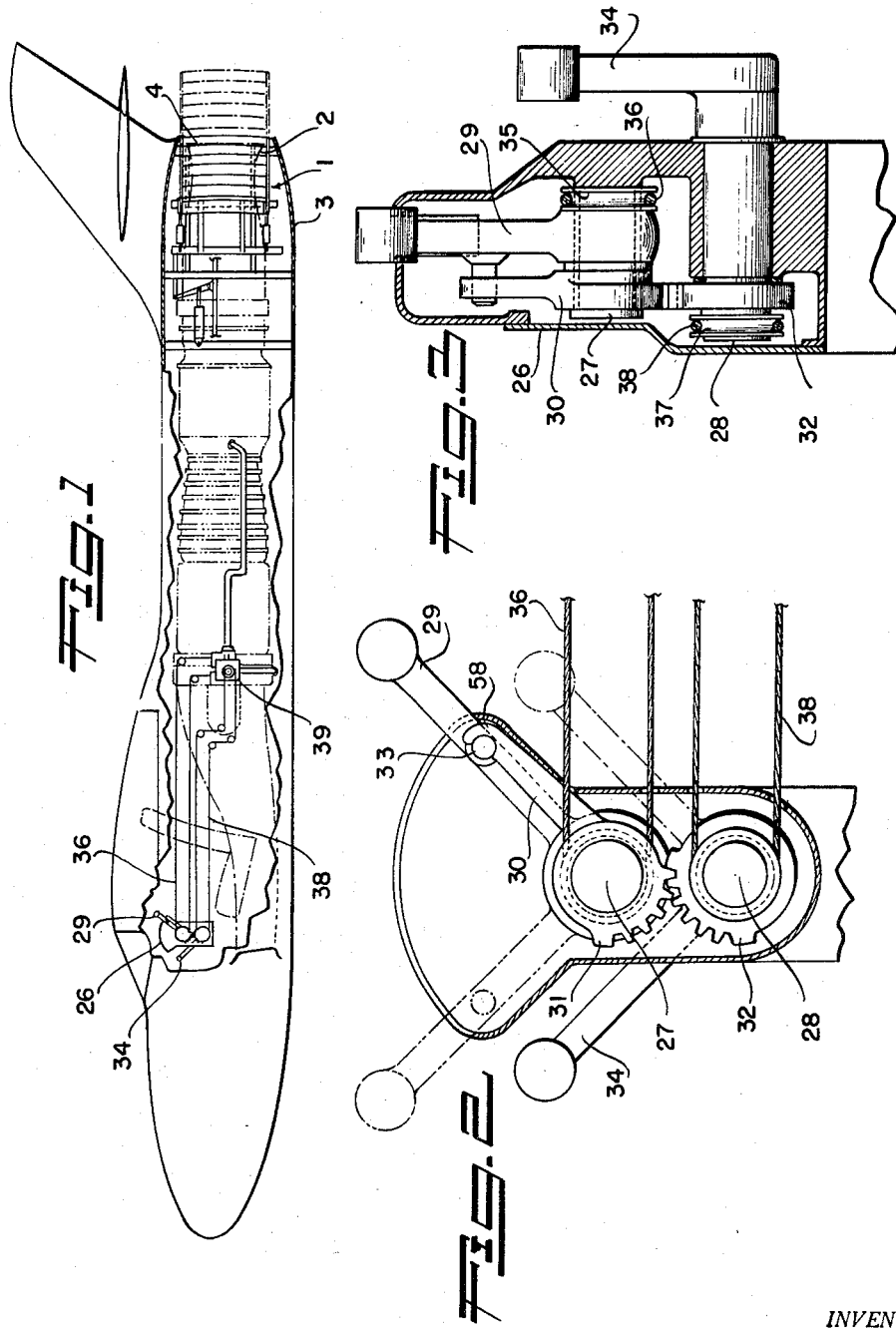
INVENTOR.
KENNETH E. WATSON
BY
George C. Sullivan
Agent

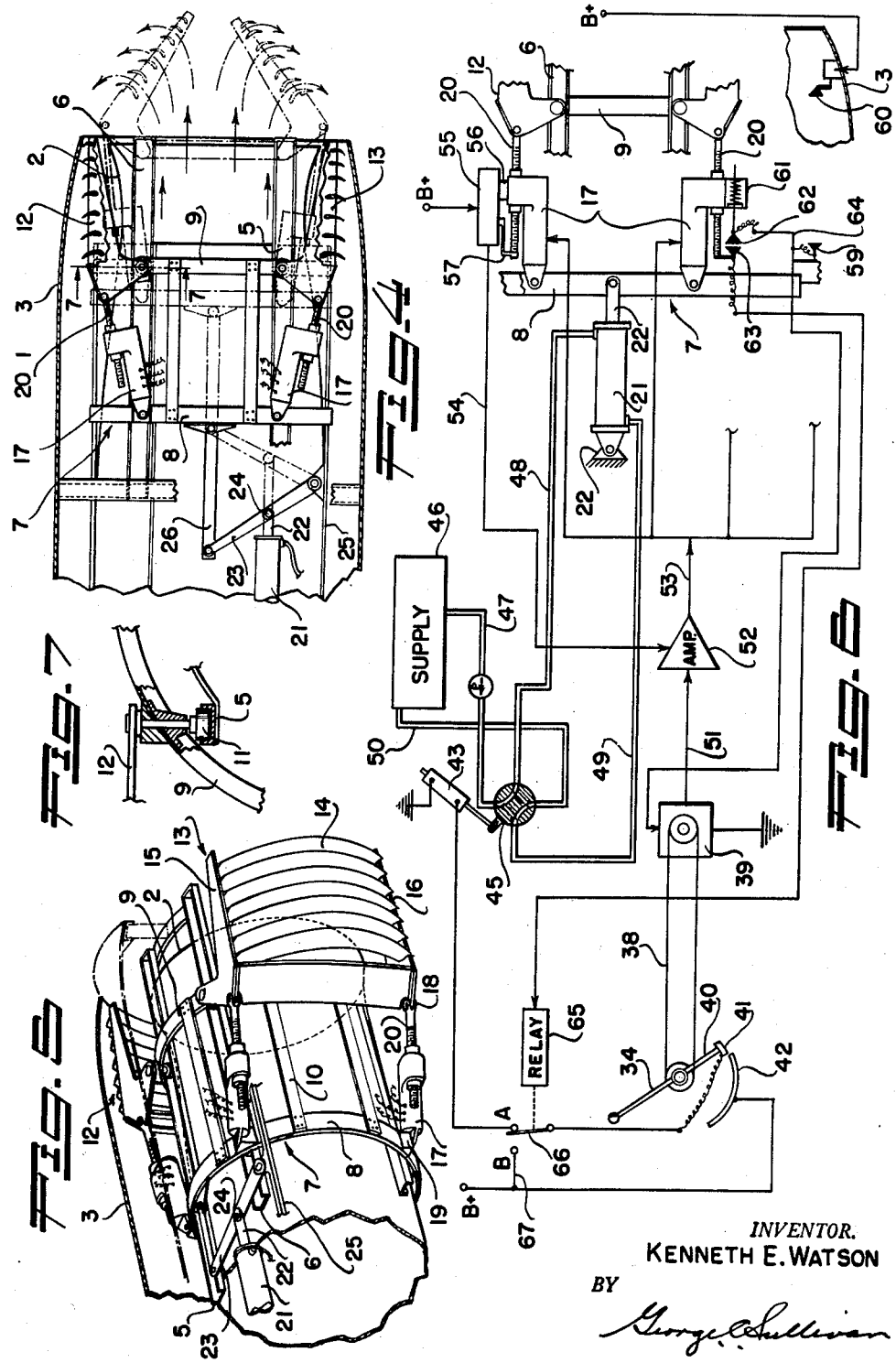

United States Patent Office 2,932,164
Patented Apr. 12, 1960

2,932,164

THRUST REVERSER AND CONTROL MECHANISM THEREFOR

Kenneth E. Watson, Van Nuys, Calif., assignor to Lockheed Aircraft Corporation, Burbank, Calif.

Application August 3, 1955, Serial No. 526,130

11 Claims. (Cl. 60—35.54)

This invention relates, generally, to aircraft propulsion systems and, more particularly, to a retractable thrust reverser and interconnecting throttle and reverser control mechanism which will provide smooth and positive regulation of the propulsion forces from turbojet engines.

The required high speed of military aircraft and the required load capacities of commercial airplanes have increased, manyfold, the already difficult problem of stopping an aircraft after landing. The reversible pitch propeller has helped to solve this problem for reciprocating engine and turbo-propeller engine aircraft. Such a solution is not applicable, however, to turbojet engine aircraft and new means must be developed to accomplish deceleration.

Numerous devices for decelerating high speed jet aircraft in flight maneuvers as well as in landing and ground handling operations have been employed in the past. Conventionally, dive brakes or flaps are used for meeting the deceleration requirements of in-flight maneuvers and drag parachutes are used for decelerating the aircraft in landing operations. The dive brakes which operate on the slipstream air to decelerate the aircraft are ineffective at landing speeds and the parachute is impractical for use at normal flight speeds. Therefore, the combination of both devices are usually required for high speed aircraft particularly where operations from other than well constructed and extra long runways are necessary.

While the dive brake is generally considered satisfactory as a high speed decelerating device, it is entirely inadequate to supplement wheel braking for reducing the landing distance. The drag parachute, in addition to having a high initial deceleration rate which makes it unsuitable for transport service, is a single-use device which can be safely employed only after the aircraft has touched the ground and an actual landing has already been largely accomplished.

A decelerating device which will function by redirecting the jet stream exhausted from the engine at high velocity would obviously be more satisfactory than the more conventional combination dive brake and parachute arrangement since it would be mainly dependent only on engine and thrust and, therefore, operate effectively at all airspeeds. A number of thrust reversers have been developed which employ this design approach. However, due to weight, affect on engine efficiency, structural problems or other considerations, they have not proven particularly successful.

An object of this invention is to provide a thrust reverser and interconnecting throttle and reverser control mechanism for turbojet engines which will respond smoothly when actuated to modulate the engine thrust and permit power-on landings by projecting a plurality of curved blades into the high velocity jet stream and thereby divert at least a portion of the jet stream in a lateral or reverse direction. The power-on landing techniques are particularly desirable since the compressor bleed air required for boundary layer control and windshield rain removal and/or defogging is not available at the lower power presently used during the approach and landing. Also, the high engine r.p.m. which can be maintained does not compromise the performance of engine driven accessories.

Another object of this invention is to provide a thrust reverser for turbojet engines which will introduce substantially no adverse affects on engine performance and which is readily adaptable for installation on existing aircraft to replace decelerating parachutes and dive flaps.

Another object of this invention is to provide a thrust reverser for turbojet engines which may be installed with only a slight weight penalty and substantially no increase in drag, the latter being due to the structural configuration of the reverser wherein the same may be carried in the annular cavity between the engine and cowling.

Another object of this invention is to provide a thrust reverser for turbojet engines which may be designed for "fail-safe" operation. That is, it will retract due to the forces applied to the blades by the jet stream should the reverser actuating mechanism fail.

Another object of this invention is to provide a thrust reverser for turbojet engines which may be controlled to provide any desired amount of thrust modulation within limits from zero to approximately fifty percent or more.

Still another object of this invention is to provide an interconnecting reverser and throttle control mechanism for turbojet engines which will provide a simple and dependable means for actuating the thrust reverser. The control mechanism will allow substantially instantaneous retraction of the reverser device from even a fully extended maximum thrust modulating position without changing the throttle setting. This is particularly advantageous when making a landing approach where an error, such as over or undershooting the field, or the like, is made which requires emergency application of forward thrust.

Further and other objects will become apparent from a reading of the following description, especially when considered in combination with the accompanying drawing wherein like numerals refer to like parts.

In the drawing:

Figure 1 is a fragmentary view schematically showing the thrust reverser and interconnecting throttle and reverser control mechanism installed in a turbojet powered aircraft;

Figure 2 is a sectional side view of the interconnecting throttle and reverser control mechanism;

Figure 3 is a sectional front view of the interconnecting throttle and reverser control mechanism;

Figure 4 is a sectional side view of the thrust reverser;

Figure 5 is a fragmentary perspective view of the thrust reverser;

Figure 6 is a view schematically showing a circuit for coupling the interconnecting throttle and reverser control mechanism with the thrust reverser; and Figure 7 is a view taken on line 7—7 of Figure 4.

Referring to Figure 1, the thrust reversing mechanism is shown carried within the annular cavity between engine tail pipe 2 and aircraft fuselage or cowling 3 adjacent aft end 4 of the engine. The construction details of the thrust reverser are best shown in Figures 4, 5 and 7 wherein a plurality of guide rails, such as rails 5 and 6, are fixedly secured to the aircraft structure and arranged longitudinally of the aircraft for supporting an annular shaped cage or carriage 7 concentric with the engine tail pipe 2. Carriage 7 includes a pair of spaced rings 8 and 9 joined by braces 10. Each ring 8 and 9 carries a plurality of rollers 11, as best shown in Figure 7, for engaging the plurality of guide rails, such as rails 5 and 6, to allow only longitudinal movement of the carriage relative to the engine tail pipe. Ring 9 of carriage 7 swingably supports a pair of jet stream deflecting blade assemblies 12 and 13 about axes common with rollers 11.

Each blade assembly 12 and 13 supports a plurality of curved vanes or blades 14 which are shaped to efficiently divert the jet stream air when inserted into the jet stream for effecting thrust modulation or thrust reversal. By properly shaping the blades, "fail-safe" operation may be obtained with the thrust reverser so that should failure of the actuating mechanism occur, the blade assemblies will retract to a position out of the jet stream by the aerodynamic forces applied to the blades in the jet stream.

The blade supporting plates 15 and 16, forming a part of each blade assembly, connect with suitable actuating means, such as an electric motor 17, at a pivot point 18 laterally disposed from the fulcrum about which the blade assemblies are allowed to swing. Motors 17 are anchored on ring 8 of carriage 7 through suitable brackets 19 so that actuation of the motors will effect linear movement of push-rods 20 and controlled swinging movement of blade assemblies 12 and 13 for modulating the engine thrust.

Not only are blade assemblies 12 and 13 made swingable into the jet stream but also carriage 7, which carries blade assemblies 12 and 13, is made movable for stowing the blade assemblies within the confines of the aircraft cowling structure when not in use. This linear movement of carriage 7 is controlled by actuating means, such as a hydraulic cylinder 21, carried at one end by the aircraft structure 22, as indicated in Figure 6. Actuating rod 22 of cylinder 21 connects with a lever 23 through pin 24 at a location intermediate the ends of the lever. One end of lever 23 is swingably carried by aircraft structure 25 and the opposite end thereof pivotally connects with a push-rod 26 carried on ring 8 of carriage 7. By properly locating pin 24 relative to the ends of lever 23, the desired longitudinal movement of the thrust reverser may be obtained for a given stroke of the actuating rod.

Operation of the thrust reversing mechanism from a fully retracted or stowed position to an extended thrust reversing position, is illustrated in Figure 4 wherein actuating rod 22, for cylinder 21, is first extended to effect longitudinal movement of carriage 7 in an aft direction along the guide rails and relative to the aircraft. When the actuating cylinder has moved the carriage to the extreme aft position the plurality of motors 17 may then be simultaneously energized to effectively rotate blade assemblies 12 and 13 into the high velocity jet stream being exhausted through tail pipe 2 of the engine. The high velocity air is thereby redirected into a lateral or reverse direction to effectively accomplish thrust modulation. Retraction of the thrust reversing mechanism must follow the reverse operating sequence wherein motors 17 are first energized to move blade assemblies 12 and 13 out of the jet stream and into a generally parallel relationship in alignment with the annular cavity formed by the engine tail pipe 2. Then retraction cylinder 21 may be actuated to move carriage 7 forwardly relative to the aircraft to stow the blade assemblies within the engine cowling. Obviously the sequencing of the operations for effecting thrust reversal are important in order to prevent swinging the blade assemblies inwardly toward one another before carriage 7 moves to the extreme aft position. Should such be allowed to occur, the engine tail pipe and the thrust reversing mechanism would both likely be damaged.

To provide quick acting and positive thrust modulation with the thrust reverser, an interconnecting throttle and reverser control mechanism is provided as shown in Figures 2 and 3, wherein a frame 26 supports a pair of laterally displaced shafts 27 and 28 arranged generally parallel to each other. Shaft 27 swingably supports a throttle lever 29 and an interconnecting lever 30 for independent rotation relative to each other. Interconnecting lever 30 is provided with a sector gear 31, as best shown in Figure 2, for engaging a sector gear 32 on shaft 28. The free end 58 of lever 30 is arranged to seat against a pin 33 secured to throttle lever 29 and effect rotation of sector gear 32 on shaft 28 only when throttle lever 29 is moved in one direction; movement of throttle lever 29 in the opposite direction is ineffective to cause rotation of sector gear 32.

A reverser control lever 34 is carried on shaft 28 and made rotationally rigid with sector gear 32, whereby rotation of reverser control lever 34 in one direction will be effective to rotate throttle control lever 29 but ineffective to move the throttle lever when rotated in the opposite direction.

A pulley, or the like, 35 is carried on shaft 27 and secured to throttle lever 29 for controlling the engine speed through a control cable 36, as shown in Figure 1, by simply moving the throttle lever. A pulley 37 is similarly secured to shaft 28 for rotational movement in response to movement of reverser control lever 34. Pulley 37 drives a thrust reverser control potentiometer transducer 39 through cable 38, as best shown in Figures 1 and 6.

The interconnecting throttle and reverser control mechanism, as described above, provides a device which is completely compatible with the natural and instinctive reactions of the pilot in that the throttle lever may be pushed forwardly to increase the forward thrust and the reverser lever may be pulled back to obtain a braking action. The interconnecting arm 30 serves to maintain the desired engine r.p.m. for all positions of the thrust reversing lever to obtain efficient reverser operation. A still further advantage of this control mechanism is that retraction of the thrust reversing mechanism may be accomplished without in any way effecting the setting of throttle control lever 39. This is particularly advantageous where it is necessary to quickly obtain forward thrust, such as in responding to a wave-off requirement when attempting to land.

It should be understood that while pulleys 35 and 37 are shown in connection with the interconnecting throttle and reverser control mechanism in Figures 2 and 3, it is for illustrative purposes only; it being obvious that any suitable means may be employed for transmitting the motion of the throttle and reverser control arms to the associated equipment in the control system.

A typical circuit for coupling the interconnecting throttle and reverser control mechanism with the thrust reverser is schematically shown in Figure 6. A switch mechanism 40 is shown driven by reverser control lever 34 for controlling the actuation of hydraulic cylinder 21 for effecting the linear movement of the thrust reverser. Contact 41 of switch 40 is held in the open position, as schematically illustrated in the drawing, when reverser control arm 34 is in a stowed or forwardmost position. Initial movement of reverser control arm 34 from the stowed position places contact 41 in engagement with contact 42 of switch 40 to apply a B+ voltage to the solenoid 43 of a four-way solenoid actuated valve 45. When solenoid 43 is deenergized, valve 45 is in the position shown, wherein fluid pressure from supply tank 46 is fed to the valve through fluid line 47, thence through line 48 to cylinder 21, causing arm 22 to move into the retracted position. By energizing solenoid 43, valve 45 is rotated to provide fluid communication between lines 47 and 49, thereby actuating cylinder 21 and causing rod 22 to move outwardly for positioning the thrust reversing mechanism in the aft location. When high pressure fluid is being supplied to cylinder 21 through lines 48 or 49 from the high pressure side of supply tank 46, the other line is in communication with a return line 50 which allows the fluid on the opposite side of the piston (not shown) in cylinder 21 to be returned to the supply tank.

Cable 38 transmits the movement of reverser control arm 34 to the reverser control potentiometer transducer 39. The transducer connects with a suitable source of electrical potential identified as B+ through switch contacts 59 and 60 to provide an output voltage through lead 51 which is proportional to the position of reverser control arm 34. The output from potentiometer transducer 39 is applied to a feedback amplifier 52 which supplies the driving voltage to the plurality of motors 17 which control the swinging movement of blade assemblies 12 and 13.

Switch contact 59 is carried on carriage 7 and switch contact 60 is carried on the aircraft cowling structure 3, as schematically shown in Figure 6, so that the B+ voltage is applied through the switch to potentiometer transducer 39 only when the carriage is in the aft position. Thus, an output from the potentiometer transducer will be obtained only upon completion of the linear movement of the thrust reverser in the aft direction. This effectively prevents improper operation of the thrust reverser which might otherwise occur as a result of quickly pulling on reverser control lever 34 and energizing motors 17 before cylinder 21 has completed its function in moving carriage 7 to the extreme aft position.

Means are also provided to obviate the possibility of de-energizing solenoid 43 and returning carriage 7 to the stowed position when blade assemblies 12 and 13 are still in a jet stream deflecting position. A switch 61 is suitably mounted on a motor 17, as schematically shown in Figure 6. Contact 62 of switch 61 is spring urged into a forwardmost position adjacent to but spaced from mating contact 63. Contact 63 is secured to push rod 20 so that as blade assemblies 12 and 13 are moved from the generally parallel, stowed position shown, it will engage contact 62 and hold switch 61 closed until the blade assemblies are again returned to the stowed position. Contact 62 connects with switch contact 59 through lead 64 so that the B+ voltage is applied to switch 61 only when carriage 7 is in the aft position and switch contacts 59 and 60 are closed. Contact 63 of switch 61 connects with a relay 65. The relay controls a switch 66 in the circuit connecting solenoid 43 with B+ via switch 40.

When relay 65 is in the de-energized condition shown in the drawing, switch 66 is in position "A," allowing switch 40 to control solenoid 43. When relay 65 is energized by connecting with B+ through switch 61 and switch contacts 59 and 60, switch 66 is moved to position "B," connecting solenoid 43 directly with B+ through lead 67 and bypassing switch 40. So long as relay 65 is energized, solenoid 43 will remain energized regardless of the position of reverser control lever 34. Therefore, linear movement of carriage 7 to the forward, stowed position cannot occur until blade assemblies 12 and 13 are moved out of the jet stream.

In order to provide proportional control for the swinging movement of the blade assemblies, amplifier 52 is of the feedback type so that the magnitude and phase of the voltage applied to motors 17 through lead 53 depend upon not only the voltage applied to the feedback amplifier through lead 51 but also to a voltage applied to the amplifier through lead 54, which is obtained from a pickup potentiometer 55. Potentiometer 55 is suitably mounted on motor 17 through bracket 56. The pickup arm 57 of potentiometer 55 is connected to push-rod 20 whereby the voltage output from the potentiometer will be proportional to the position of the push-rod and hence to the position of blade assemblies 12 and 13. The extent to which the blade assemblies project into the high velocity jet stream immediately aft of the tail pipe is thereby made dependent upon the position of reverser control lever 34 relative to its neutral or stowed position.

Operation of the complete thrust reverser system is believed obvious from a reading of the foregoing description. During normal aircraft operation throttle lever 29 is manually controlled in the conventional manner to regulate the engine speed and thrust output while the reverser control lever 34 remains in the extreme forward position, shown in Figure 2, maintaining the thrust reversing mechanism in the retracted or stowed position between the engine tail pipe and the cowling. When reverse thrust is desired for reducing the aircraft forward speed, such as when performing maneuvers or when making a landing, the reverser control lever is pulled back, causing the reverser mechanism carriage 7 to move along the plurality of rails such as 5 and 6 to the extreme aft end of the engine tail pipe. When carriage 7 reaches the extreme aft position transducer 39 connects with B+ through switch contacts 59 and 60, allowing the blade assemblies 11 and 12 to swing inwardly toward one another for redirecting the high velocity jet stream being exhausted through tail pipe 2. The amount of thrust modulation is proportional to the amount reverser lever 34 has been moved from the forwardmost position.

Since maximum braking action is obtained not only when blade assemblies 11 and 12 are moved inwardly into the jet stream as far as possible but also when the engine thrust output is substantially at a maximum, the reverser control arm 34 is interconnected with the throttle control lever 29 whereby the engine speed is automatically regulated according to the thrust reverser setting. Should the conditions require the immediate application of forward thrust, it is only necessary to return the reverser control lever 34 to the forwardmost stowing position since the throttle control lever 29 will remain in the established power-on position. Under conditions where maximum thrust reversal is not being applied and maximum forward thrust is required, it will be necessary to return the thrust reverser lever to neutral and also push throttle lever 29 forwardly to the maximum thrust position. Under normal operating conditions, however, manipulation of both the throttle and reverser control levers, to provide the desired aircraft performance, will not be necessary. This interconnecting lever arrangement makes it virtually impossible to obtain unfavorable rates of deceleration such as might often otherwise be the case were the control levers operable independently of one another. With independent controls the reverser could be set at a high percent thrust modulating position while the throttle setting is low and under these conditions, if the throttle lever were moved to increase the engine thrust without first decreasing the percent of thrust modulation of the reverser, a high deceleration rate would be obtained instead of high forward thrust. It is believed obvious that in emergency situations when forward thrust is needed quickly this error could easily be made and for this reason alone the interconnecting lever system is a practical necessity. By requiring the movement of only one of the levers to provide the desired acceleration and deceleration forces, the reliability of the thrust reverser is greatly improved.

Return of the thrust reverser to the stowed position will be properly effected regardless of how quickly reverser control lever 34 is moved to the stowing position. Linear movement of carriage 7 from the extreme aft position connot occur until blade assemblies 12 and 13 have moved out of the jet stream sufficiently to open switch 61 and de-energize relay 65.

While specific circuitry has been shown and described herein for coupling the interconnecting throttle and reverser control mechanism with the thrust reverser, it is intended to be illustrative only. The coupling may be accomplished electrically, mechanically or hydraulically, using conventional components and techniques. It is only necessary to provide a system which will maintain the specified sequence in the operation of the reverser.

Also, the interconnecting throttle and reverser control mechanism is equally useful with any type of thrust reverser and is not limited to the particular reverser shown and described herein.

It should be understood that certain alterations, modifications and substitutions, including those suggested here-

I claim:

1. A braking device for aircraft having a turbine engine adapted to exhaust a jet stream through the aft end thereof at high velocity to produce thrust comprising, a carriage carried by said aircraft concentric with said engine and arranged for longitudinal movement adjacent the aft end thereof, a plurality of blade assemblies swingably carried by said carriage for projecting into the jet stream aft of the engine and redirecting at least a portion of the energy in a transverse direction for effectively modulating the engine thrust, actuating means carried by the aircraft and connecting with said carriage for effecting longitudinal movement thereof to position said blade assemblies aft of the engine, actuating means carried by said carriage and connecting with said blade assemblies for effecting swinging movement thereof into the jet stream, a reverser control lever carried by the aircraft and operatively connected with both said actuating means, engine speed control lever means movable in one direction by said reverser control lever for advancing engine speed in accordance with the movement of said blade assemblies into the jet stream, and position sensing means associated with said reverser control lever and said actuating means for allowing only sequential operation of the latter whereby swinging movement of the blade assemblies can occur only when said carriage is in the aft position.

2. In an aircraft having a turbine engine arranged to exhaust a jet stream through the aft end thereof at high velocity for producing thrust and a remotely located throttle control lever for regulating engine speed, a thrust reverser comprising, a plurality of arms swingably carried by the aircraft adjacent the aft end of the engine, a plurality of curved blades fixedly carried on each of said arms, actuating means carried by the aircraft and connecting with said arms for moving the latter between a retracted position out of the jet stream to an extended position projecting into the jet stream whereby the curved blades redirect at least a portion of the high velocity gases in the jet stream in a transverse direction relative to the longitudinal axis of the engine and spoil the thrust, and thrust reverser control means carried by the aircraft and arranged adjacent the throttle control lever and operatively engaging said actuating means, said thrust reverser control means including a floating member interconnecting the thrust reverser control means with said throttle lever whereby the engine speed may be advanced with either said throttle lever or said thrust reverser control means.

3. A braking device for aircraft having a turbine engine adapted to exhaust a jet stream through the aft end thereof at high velocity to produce thrust comprising, a carriage carried by said aircraft concentric with said engine and arranged for longitudinal movement adjacent the aft end thereof, a plurality of blade assemblies swingably carried by said carriage for projecting into the jet stream aft of the engine and redirecting at least a portion of the energy in a transverse direction for effectively modulating the engine thrust, actuating means carried by the aircraft and connecting with said carriage for effecting longitudinal movement thereof to position said blade assemblies aft of the engine, actuating means carried by said carriage and connecting with said blade assemblies for effecting swinging movement thereof into the jet stream, a reverser control lever carried by the aircraft and operatively connecting with both said actuating means, engine speed control means connecting with said reverser control lever for automatically regulating engine speed in accordance with the movement of said blade assemblies into the jet stream, and switch means associated with said reverser control lever and said actuating means and allowing only sequential operation of the latter whereby swinging movement of the blade assemblies can occur only when said carriage is in the aft position.

4. A braking device for aircraft having a turbine engine adapted to exhaust a jet stream through the aft end thereof at high velocity to produce thrust comprising, a carriage carried by said aircraft concentric with said engine and arranged for longitudinal movement adjacent the aft end thereof, a plurality of blade assemblies swingably carried by said carriage for projecting into the jet stream aft of the engine and redirecting at least a portion of the energy in a transverse direction for effectively modulating the engine thrust, actuating means carried by the aircraft and connecting with said carriage for effecting longitudinal movement thereof to position said blade assemblies aft of the engine, actuating means carried by said carriage and connecting with said blade assemblies for effecting swinging movement thereof into the jet stream, a reverser control lever carried by the aircraft and operatively connecting with both said actuating means, and switch means associated with said reverser control lever and said actuating means and allowing only sequential operation of the latter whereby swinging movement of the blade assemblies can occur only when said carriage is in the aft position.

5. A braking device for aircraft having a turbine engine adapted to exhaust a jet stream through the aft end thereof at high velocity to produce thrust comprising, a carriage carried by said aircraft concentric with said engine and arranged for longitudinal movement adjacent the aft end thereof, a plurality of blade assemblies swingably carried by said carriage for projecting into the jet stream aft of the engine and redirecting at least a portion of the energy in a transverse direction for effectively modulating the engine thrust, actuating means carried by the aircraft and connecting with said carriage for effecting longitudinal movement thereof to position said blade assemblies aft of the engine, actuating means carried by said carriage and connecting with said blade assemblies for effecting swinging movement thereof into the jet stream, and a reverser lever carried by the aircraft and operatively connecting with both said actuating means for controlling the latter.

6. A thrust modulating control device for aircraft having a jet engine and jet stream deflecting means associated with said engine comprising, a first lever regulating engine speed, a second lever adjacent said first lever and regulating said jet stream deflecting means, the advancing movement of said levers to increase engine speed and the effectiveness of said jet stream deflecting means being in opposite directions, and a third lever coupled to the second lever and driven to movement in one direction by movement of said second lever in the opposite direction, said third lever being arranged to engage said first lever and move it only in the advancing direction in response to movement of said second lever in the advancing direction whereby the engine speed may be advanced with either lever and retarded with only the first lever.

7. A thrust modulating control device for aircraft having a jet engine and jet stream deflecting means associated with said engine comprising, a throttle lever connected to said engine to effect increased fuel feed when moved in a first direction, a jet stream deflection means control lever connected to said deflecting means to effect operative positioning of said deflecting means when moved in a second direction opposite to said first direction, a floating member operatively connecting with one of said levers and driven to movement in one of said directions by movement of the lever connected therewith in the opposite direction, said floating member including means arranged to engage the other lever and move it only in one of said directions whereby said other lever may be moved in the last mentioned one of said directions by movement of either lever when said means is engaged with said other lever.

8. A thrust reversing device for aircraft having a jet engine arranged to exhaust a jet stream at high velocity for producing thrust comprising, jet stream deflecting means retractably carried by the aircraft adjacent the jet stream exhaust end of the engine for redirecting at least a portion of the jet stream in a lateral direction when extended, retracting means carried by the aircraft and operatively engaging said jet stream deflecting means for actuating the same, a pair of manually operable control levers movably carried on the aircraft, one of said pair of levers connecting with the throttle mechanism of the engine and the other of said pair of levers connecting with said retracting means to effect increased fuel feed and extension of said jet stream deflecting means respectively upon advancement of said levers, said levers mounted and connected with their directions of advancement opposite to one another, and arm means driven by a first of said pair of levers in a reverse direction relative to the movement of said first lever and arranged to engage the second of said pair of levers and move it only in its advancing direction when so engaged whereby said second lever may be advanced by the advancement of either lever.

9. A thrust modulating control device for aircraft having a jet engine and jet stream braking means associated with said engine comprising, a frame, a pair of shafts carried by said frame and spaced apart generally parallel to each other, a throttle lever swingably carried by one of said shafts and connecting with said engine to regulate engine speed, said throttle lever being movable in one direction to advance engine speed and in the opposite direction to retard engine speed, a brake lever swingably carried by the other of said shafts and connecting with said braking means to regulate braking action, said brake lever being movable in said opposite direction to increase braking action and in said one direction to decrease braking action, and an arm rotatably carried by said frame and operatively coupled to said brake lever to effect counter-rotational-movement-therebetween in response to movement of the brake lever, said arm including means arranged to engage said throttle lever and move it only in said one direction whereby the engine speed may be advanced with either lever and retarded with only the throttle lever.

10. A thrust modulating control device for aircraft having a jet engine and jet stream braking means associated with said engine comprising, a frame, a pair of shafts carried by said frame and spaced apart generally parallel to each other, a throttle lever swingably carried by one of said shafts and connecting with said engine to regulate engine speed, a brake lever swingably carried by the other of said shafts and connecting with said braking means to regulate braking action, an arm swingably carried at one end by said frame, said arm having a sector gear formed on the one end thereof, a driving gear secured to said brake lever and arranged to operatively engage said sector gear for effecting rotation of said arm in response to rotation of the brake lever, and a detent carried on said throttle lever for engaging said arm whereby said throttle lever is moved to advance the engine speed in response to movement of the brake lever.

11. The invention as in claim 8 and wherein said first of said pair of levers is the lever connected to said jet stream deflecting means and the second of said pair of levers is the lever connected with the throttle mechanism of the engine.

References Cited in the file of this patent
UNITED STATES PATENTS

| | | |
|---|---|---|
| 2,167,110 | Gutenberg et al. | July 25, 1939 |
| 2,507,767 | Castor et al. | May 16, 1950 |
| 2,619,794 | Lombard | Dec. 2, 1952 |
| 2,758,805 | Graham | Aug. 14, 1956 |
| 2,797,548 | Marchal et al. | July 2, 1957 |

FOREIGN PATENTS

| | | |
|---|---|---|
| 56,672 | France | July 23, 1952 |
| | (Addition to 1,030,483) | |
| 1,018,650 | France | Oct. 15, 1952 |